(12) United States Patent
Acero et al.

(10) Patent No.: US 7,865,357 B2
(45) Date of Patent: Jan. 4, 2011

(54) SHAREABLE FILLER MODEL FOR GRAMMAR AUTHORING

(75) Inventors: Alejandro Acero, Bellevue, WA (US); Dong Yu, Kirkland, WA (US); Ye-Yi Wang, Redmond, WA (US); Yun-Cheng Ju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 11/375,488

(22) Filed: Mar. 14, 2006

(65) Prior Publication Data

US 2007/0219793 A1      Sep. 20, 2007

(51) Int. Cl.
G06F 17/27      (2006.01)
G06F 17/20      (2006.01)
G10L 15/00      (2006.01)
G10L 15/18      (2006.01)

(52) U.S. Cl. ................. 704/9; 704/1; 704/257
(58) Field of Classification Search ........ None
See application file for complete search history.

(56) References Cited

U.S. PATENT DOCUMENTS

| | | | | | |
|---|---|---|---|---|---|
| 5,675,706 | A | * | 10/1997 | Lee et al. ............ | 704/256 |
| 6,016,470 | A | * | 1/2000 | Shu .................... | 704/244 |
| 6,223,155 | B1 | * | 4/2001 | Bayya ................. | 704/243 |
| 6,374,217 | B1 | * | 4/2002 | Bellegarda ........... | 704/240 |
| 7,302,381 | B2 | * | 11/2007 | Pokhariyal et al. .... | 704/1 |
| 7,487,091 | B2 | * | 2/2009 | Miyazaki ............. | 704/255 |
| 2004/0176945 | A1 | * | 9/2004 | Inagaki et al. ........ | 704/4 |
| 2004/0220809 | A1 | * | 11/2004 | Wang et al. .......... | 704/257 |
| 2004/0243393 | A1 | * | 12/2004 | Wang .................. | 704/9 |

OTHER PUBLICATIONS

Mangu et al. Lattice Compression in the Consensual Post-Processing Framework. Proceedings of SCI/ISAS, Orlando, Florida, 1999.*
Wang, Kuansan. Semantics Synchronous Understanding for Robust Spoken Language Applications. in Proc. IEEE Workshop Automatic Speech Recognition and Understanding, St. Thomas, U.S. Virgin Islands, 2003, pp. 640-645.*
Kawahara et al. Speaking Style Dependent Lexicalized Filler Model for Key Phrase Detection and Verification. 5th Intl Conf on Spoken Language Processing (ICSLP 98), Sydney, Australia, Nov. 30-Dec. 4, 1998.*
Wang, Kuansan. Semantic Modeling for Dialog Systems in a Pattern Recognition Framework. Proc. ASRU-2001, Trento, Italy, 2001.*
Allauzen et al. A General Weighted Grammar Library. In Proc. of the 9th Intl Conference on Automata, Kingston, Ontario, Jul. 2004.*

(Continued)

Primary Examiner—Talivaldis I Smits
Assistant Examiner—Jesse S Pullias
(74) Attorney, Agent, or Firm—Westman, Champlin & Kelly, P.A.

(57) ABSTRACT

A method of forming a shareable filler model (shareable model for garbage words) from a word n-gram model is provided. The word n-gram model is converted into a probabilistic context free grammar (PCFG). The PCFG is modified into a substantially application-independent PCFG, which constitutes the shareable filler model.

12 Claims, 8 Drawing Sheets

OTHER PUBLICATIONS

Lefevre et al. Genericity and Adaptability Issues for Task-Independent Speech Recognition. ISCA ITRW 2001, Sophia-Antipolis, France, Aug. 2001.*

A.S. Manos et al., "A Segment-Based Wordspotter using Phonetic Filler Models," IEEE, 1997, pp. 899-902.

R. Rose et al., "A Hidden Markov Model-based Keyword Recognition System," IEEE, 1990, pp. 129-132.

J. Wilpon et al., "Automatic Recognition of Keywords in Unconstrained Speech Using Hidden Markov Models," IEEE, 1990, pp. 1870-1878.

Qiquang Lin et al., "Key-Phrase Spotting using an Integrated Language Model of N-Grams and Finite-State Grammar," In Proc. Of Eurospeech, Sep. 22-25, 1997, pp. 255-258.

M.E. Hennecke et al., "Easy Configuration of Natural Language Understanding Systems," in Proc. Voice Operated Telecom Services, COST 249, 2000, pp. 1-4.

R. Meliani et al., "Accurate Keyword Spotting Using Strictly Lexical Fillers," in Proc. Of ICASSP, 1997, pp. 907-910.

R.C. Rose, "Keyword Detection in Conversational Speech Utterances using Hidden Markov Model based Continuous Speech Recognition," Computer Speech and Language, vol. 9, 1995, pp. 309-333.

G. Riccardi et al., "Stochastic Automata for Language Modeling," Computer Speech and Language, vol. 10(4), 1996, pp. 265-293.

Ye-Yi Wang et al., "SGStudio: Rapid Semantic Grammar Development for Spoken Lanugage Understanding," Eurospeech 2005, Lisbon, Portugal, Sep. 2005, pp. 1-4.

M. Weintraub, "Keyword-Spotting Using SRI's Decipher™ Large-Vocabulary Speech-Recognition System," IEEE, 1993, pp. 11-463 to 11-466.

C. Chelba et al., "Speech Ogle: Indexing Uncertainty for Spoken Document Search," in Proc. of the Assoc. for Computational Linguistics, Jun. 2005, pp. 41-44.

* cited by examiner

SHAREABLE FILLER MODEL FOR GRAMMAR AUTHORING

BACKGROUND

While great progress in speech recognition accuracy has taken place over the last decade, building a robust speech recognition application is still usually expensive because of a relatively long development cycle required to get an application to an acceptable accuracy level. One of the difficulties in developing speech recognition applications is the development of grammars that recognize a user's input.

Consider a relatively simple example of developing a speech recognition system for purchasing movie tickets. A developer of such a system may use a prompt such as "Welcome to the movie line. How many tickets do you want to purchase?" and then build a simple digits context free grammar (CFG) including numbers 1 through 10, for example. However, when using this system, rather than simply uttering a number (saying "two," for example), some users may respond by saying "I want to buy two tickets," for example, which would not be covered by the grammar and thus lead to higher error rates or increased rejection. Such a problem can sometimes be ameliorated by a careful choice of words, for the prompt, which instruct the user to stay within the grammar (for example, "Please say a number between 1 and 10"). Another approach to addressing this problem is to build grammars with increased coverage. However, in general, it is relatively difficult to manually construct a CFG when there are numerous different ways of asking for the same item(s).

An alternative approach to achieving the same goal is to use semantic (or keyword) spotting in which models for garbage words, referred to as filler models (FMs), are used. Of the existing FMs, n-gram based FMs have been shown to offer superior accuracy. However, the existing n-gram based FMs require a custom FM trained from domain data.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A method of forming a shareable filler model (shareable model for garbage words) from a word n-gram model is provided. In the method, the word n-gram model is converted into a probabilistic context free grammar (PCFG). The PCFG is modified into a substantially application-independent PCFG, which constitutes the shareable filler model.

A grammar architecture and a speech recognition system that utilize a shareable filler model are also provided.

BRIEF DESCRIPTION OF THE DRAWINGS

FIG. 9-1 is a schematic illustration of a PCFG generated using filler models and additional context cues.

FIG. 9-2 is a diagrammatic illustration of the formation of a language model by interpolating a training set with a shareable filler model.

DETAILED DESCRIPTION

The present embodiments deal with the authoring of speech grammars. However, before describing the present embodiments in greater detail, one illustrative environment in which the present embodiments can be used will be described.

Exemplary Computing Environment

Figure 1:
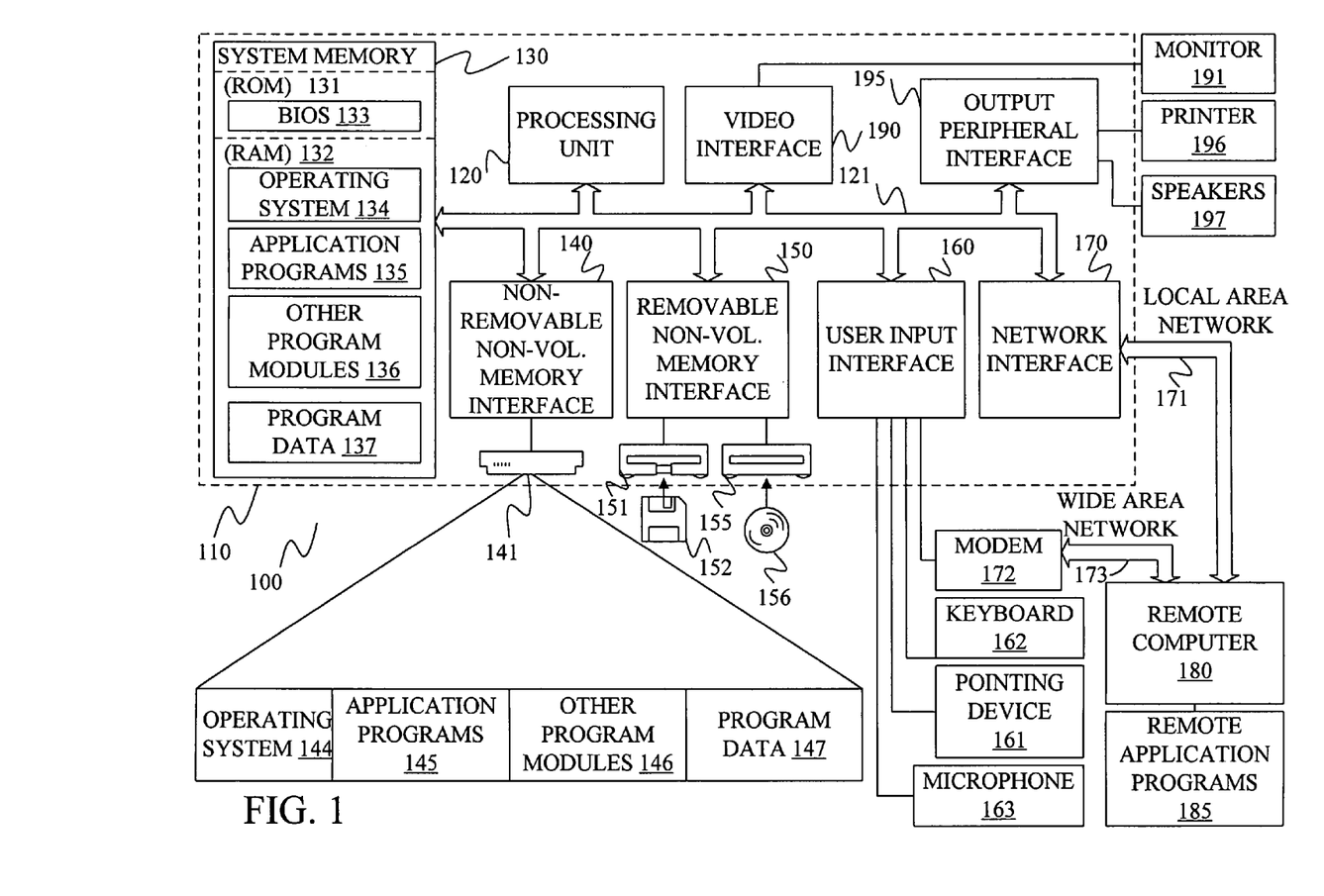
FIG. 1 is a block diagram of one illustrative computing environment in which the present embodiments can be implemented.

FIG. 1 illustrates an example of a suitable computing system environment 100 on which the present embodiments may be implemented. The same reference numerals are used in the various figures to represent the same or similar elements. The computing system environment 100 is only one example of a suitable computing environment and is not intended to suggest any limitation as to the scope of use or functionality of the present embodiments. Neither should the computing environment 100 be interpreted as having any dependency or requirement relating to any one or combination of components illustrated in the exemplary operating environment 100.

The embodiments are operational with numerous other general purpose or special purpose computing system environments or configurations. Examples of well-known computing systems, environments, and/or configurations that may be suitable for use with the present embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, being executed by a computer. Generally, program modules include routines, programs, objects, components, data structures, etc. that perform particular tasks or implement particular abstract data types. The embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the present embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which can be either built into the computer or a separate device), a telephony board connected to a telephone line, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

General Speech Recognition Embodiment

Figure 2:
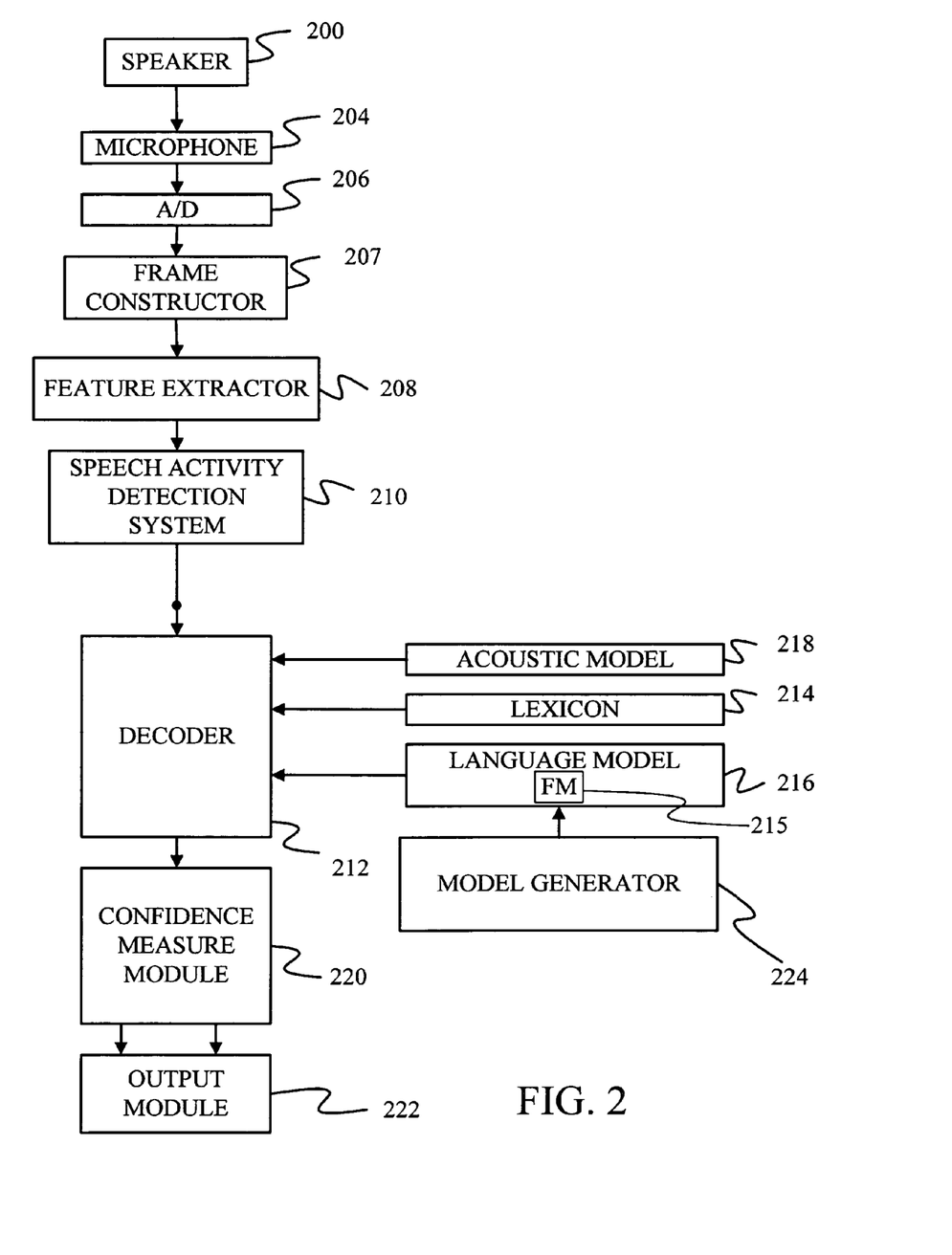
FIG. 2 is a block diagram of one illustrative speech recognition system in which the present embodiments can be used.

FIG. 2 provides a block diagram of an environment in which language models (LMs) developed using the present techniques may be utilized. In particular, FIG. 2 shows a speech recognition system in which a LM 216, developed using the present techniques, can be used to help identify the linguistic content of an input signal.

In FIG. 2, a speaker 200 speaks into a microphone 204. The audio signals detected by microphone 204 are converted into electrical signals that are provided to analog-to-digital (A-to-D) converter 206.

A-to-D converter 206 converts the analog signal from microphone 204 into a series of digital values. In several embodiments, A-to-D converter 206 samples the analog signal at 16 kHz and 16 bits per sample, thereby creating 32 kilobytes of speech data per second. Of course, other sampling can be used. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extraction modules include modules for performing Linear Predictive Coding (LPC), LPC derived Cepstrum, Perceptive Linear Prediction (PLP), Auditory Model Feature Extraction, and Mel-Frequency Cepstrum Coefficients (MFCC) feature extraction. Note that the embodiments are not limited to these feature extraction modules and that other suitable modules may be used.

The feature extraction module produces a stream of feature vectors that are each associated with a frame of the speech signal. This stream of feature vectors is provided to speech activity detection system 210, which detects whether a feature vector represents speech or non-speech (such as silence or noise). If system 210 decides that the feature vector represents speech, the feature vector is provided to decoder 212.

Decoder 212 identifies a most likely sequence of words based on the stream of feature vectors, an acoustic model 218, a lexicon 214 and LM 216. The particular method used for decoding is not important to the present embodiments and any of several known methods for decoding may be used.

The most probable sequence of hypothesis words is provided to a confidence measure module 220. Confidence measure module 220 identifies which words are most likely to have been improperly identified by the speech recognizer, based in part on a secondary acoustic model (not shown). Confidence measure module 220 then provides the sequence of hypothesis words to an output module 222 along with identifiers indicating which words may have been improperly identified. Those skilled in the art will recognize that confidence measure module 220 is not necessary for the practice of the present embodiments.

It should be noted that, LM 216 differs from current LMs in that it includes a shareable n-gram based filler Model (FM) 215, which is described in detail further below. LM 216 can be generated by a model generator 224 that, in general, can implement one or more LM generation techniques described further below.

Although FIG. 2 depicts a speech recognition system, the present embodiments may be used in any pattern recognition system and is not necessarily limited to speech.

The derivation and implementation of one shareable n-gram based FM embodiment is described in detail below. It should be noted that the shareable n-gram based FM embodiment described below is only an example.

Derivation of a Specific Sharable N-Gram Based FM

A typical optimization performed by an automatic speech recognition system (ASR) is expressed as follows:

$$\hat{w} = \underset{w}{\mathrm{argmax}}\, p(w \mid A) = \underset{w}{\mathrm{argmax}}\, p(A \mid w) \cdot p(w) \qquad \text{Equation 1}$$

where $\hat{w}$ is a recognized word sequence, A is an acoustic signal, w is a word sequence hypothesis and p(w) is a LM probability. In a telephony application (such as the movie ticket purchasing application described above), LM probability is typically specified by a probabilistic context free grammar (PCFG). The role of a PCFG in developing a shareable n-gram FM is described further below.

Figure 3:
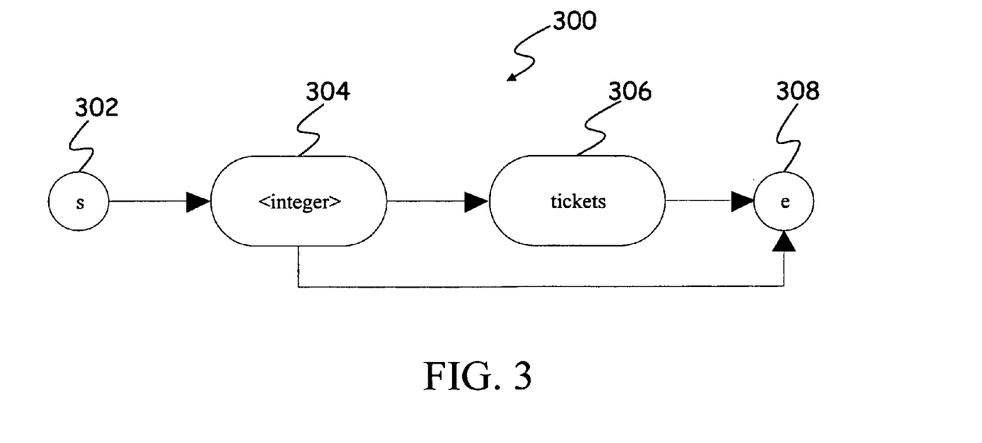
FIG. 3 is a schematic illustration of an example context free grammar (CFG).

FIG. 3 illustrates, for the movie ticket purchasing application, a CFG example for a dialog turn starting with the prompt "How many tickets do you want to buy?". In FIG. 3, CFG 300 includes a start node (s) 302, an end node (e) 308, and grammar alternatives 304 and 306. If a user utters anything other than only a number (<integer> 304), or a number and the word tickets, it will be rejected by a system using the CFG of FIG. 3.

Figure 4:
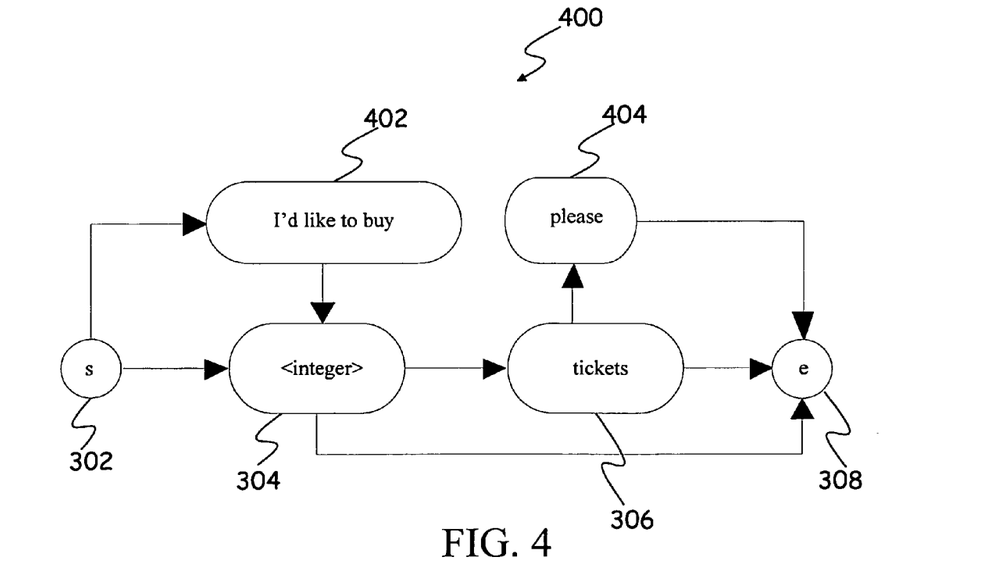
FIG. 4 is a schematic illustration of the example CFG of FIG. 3 with greater grammar coverage.

A speech expert who is familiar with the domain may include additional alternatives in the grammar as shown in FIG. 4, which illustrates CFG 400. As can be seen in FIG. 4, the example additional alternatives are "I'd like to buy," which is represented by reference numeral 402, and "please," which is represented by reference numeral 404.

Grammars authored in the manner shown in FIGS. 3 and 4, in general, do not usually perform robustly for two reasons. First, the grammar coverage is usually poor since it is impossible for the grammar author to think of all possible callers' responses. This is especially true at the early stage of application development when little real data is available. Second, as noted earlier, it is not easy to manually construct a CFG when there are numerous different ways of asking for the same item(s).

Figure 5:
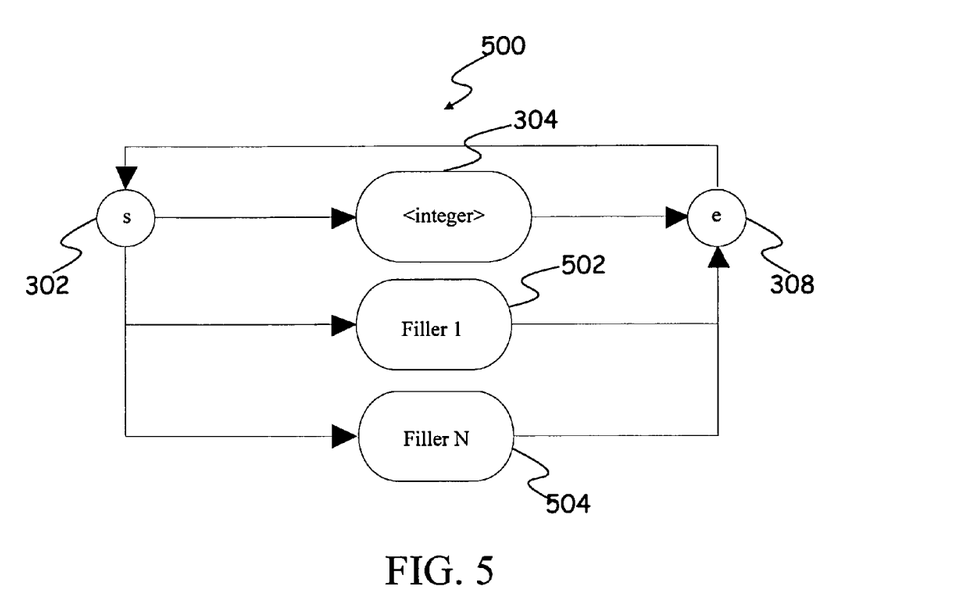
FIG. 5 is a schematic illustration of a slot spotting based grammar.

An alternative approach to achieving the same goal, which was discussed very briefly earlier, is to use semantic (or keyword) spotting using grammar structure 500, shown in FIG. 5, in which fillers (such as 502 and 504) are used to model garbage words. Three categories of FMs have been proposed: acoustic only FMs, acoustic-LM FMs, and LM based FMs. Acoustic only FMs are multi-state Hidden Markov Models (HMMs) trained with garbage words. Acoustic-LM FMs use a subword (phoneme or syllable) LM on top of acoustic fillers to improve performance. LM based FMs use word n-gram LMs to model words around a keyword. Of the above-listed three categories of FMs, LM based FMs have been shown to offer the best accuracy, but require a custom FM trained from domain data. Further, these existing FMs usually require a likelihood ratio based hypothesis test that is not always supported by commercial recognizers.

In accordance with the present embodiments, a FM, which is word n-gram based, that can be shared by different applications is provided. As will be apparent from the experimental results provided further below, in spite of the shareable nature of the FM, it can achieve a level of recognition accuracy close to that of an n-gram based FM customized for a specific application. Also, the shareable FM does not require a hypothesis test built in a decoder with which it is used and therefore can run in many standard ASR engines. This is because the shareable FM (and LM (such as 216) that includes the shareable FM) inherently address a likelihood that a speech segment is a keyword or garbage.

Figure 6:
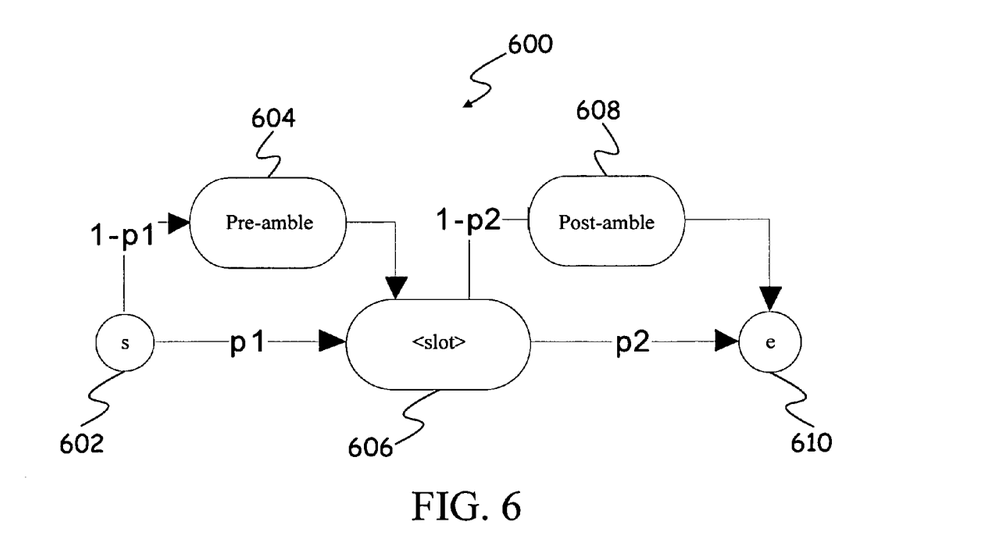
FIG. 6 is a schematic illustration of a grammar constructed with a pre-amble, a post-amble and a slot.

FIG. 6 illustrates an example grammar architecture 600 from which some of the present embodiments are developed. In a basic authoring paradigm, a grammar (such as 600) is simply constructed with pre-ambles (such as 604), post-ambles (such as 608), and slots (such as 606) as shown in FIG. 6. Pre-amble 604 and post-amble 608 are fillers modeled with word n-grams, and p1 and p2 are a pre-amble bypass probability (or weight) and a post-amble bypass probability (or weight), respectively. In this construction, <slot> 606 carries semantic information such as numbers, a list of commands, date, time, currency, credit card numbers, etc. Nodes 602 and 610 are start and end nodes, respectively, of grammar 600.

FIG. 6 is used as a basic grammar structure because a semantic spotting problem can be formally described as:

$H_0$ (null hypothesis): <slot> exists $H_\alpha$ (alternative hypothesis): <slot> does not exist The null hypothesis is taken if $p(<slot>|A)>T$ where T is a predetermined probability threshold. It should be noted that $$p(\langle slot \rangle | A) = \sum_{w_{pre}, w_{post}} p(w_{pre} \langle slot \rangle w_{post} | A)$$
$$= \frac{\sum_{w_{pre}, w_{post}} p(A | w_{pre} \langle slot \rangle w_{post}) p(w_{pre} \langle slot \rangle w_{post})}{p(A)}$$

Equation 2 where $w_{pre}$ are pre-amble words (can be empty), $w_{post}$ are post-amble words (can be empty), and $p(w_{pre}<slot>w_{post})$ is a LM probability for an utterance containing <slot>. This LM probability (or posterior probability) can be computed from an ASR lattice in a known manner. For simplicity, in the present embodiments, for each utterance, only a top choice of LM probability is chosen from a list of results from the ASR lattice.

The present embodiments do not use an explicit segmental likelihood ratio test, although pre-amble and post-amble bypass probabilities (such as p1 and p2) are used to balance accuracy and rejections. In the present embodiments, an ASR engine only needs to pick up a best path based on an overall likelihood score, and transitions are automatically embedded in the best path. One benefit of this approach is a high rejection rate for out-of-grammar (OOG) utterances because the best path for passing through the whole grammar would have a much lower score than a path that loops within a pre-amble node. It should be noted that, unlike acoustic FMs, transitions inside an FM, of the present embodiments, are constrained by n-grams and therefore better recognition accuracy can be achieved for fillers such as pre-amble 604 and post-amble 608.

Figure 7:
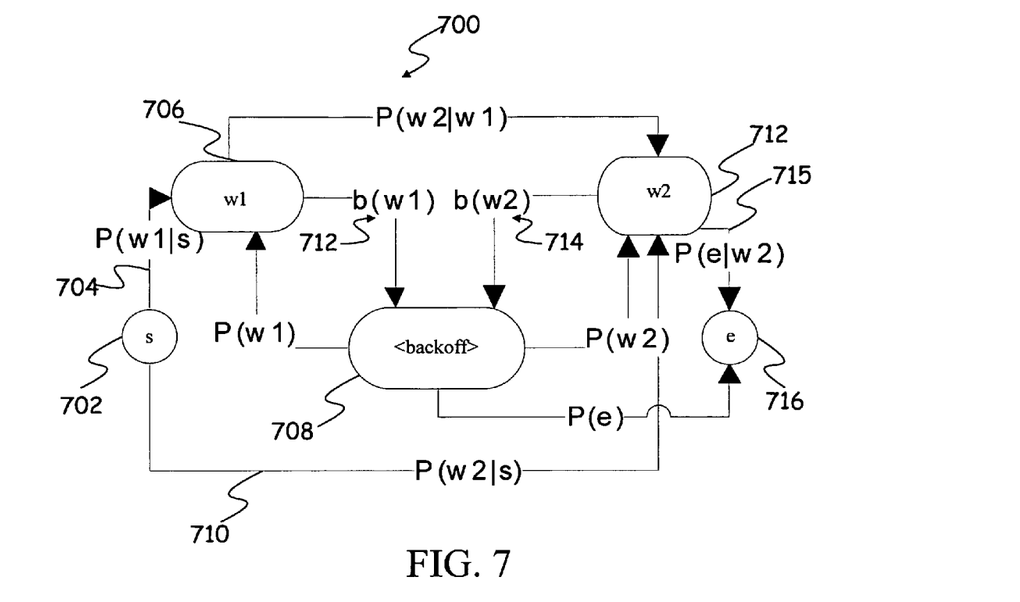
FIG. 7 is a schematic illustration of a probabilistic context free grammar (PCFG) converted from a two word bi-gram.

Many commercial recognizers allow for the running of either a word n-gram model or a CFG, but not a hybrid. To address this problem, in the present embodiments, a word n-gram model is converted to a PCFG. FIG. 7 illustrates an example PCFG 700 converted from a two word bi-gram. The two words in the example are w1, which is represented by reference numeral 706, and w2, which is represented by reference numeral 712. It should be noted that PCFG 700 represents only a filler portion (such as pre-amble 604 (FIG. 6) or post-amble 608 (FIG. 6)) of a grammar. In FIG. 7, start node (s) is represented by reference numeral 702 and end node (e) is represented by reference numeral 716.

In the example PCFG 700 shown in FIG. 7, bi-gram p(w1|w2) is not covered by training data. Instead, the probability p(w1|w2) is smoothed with backoff via a backoff node (such as 708) and estimated as:

$$p(w1|w2) \approx b(w2)p(w1)$$

Equation 3 where b(w2), represented by reference numeral 714, is a backoff weight of w2. Similarly, p(e|w1) is not in PCFG 700 and can be estimated as:

$$p(e|w1) \approx b(w1)p(e)$$

Equation 4 where b(w1), represented by reference numeral 712, is a backoff weight of w1.

Although the n-gram model, on which PCFG 700 is based, could be trained using in-domain utterances, this is often not possible before the application has been built and deployed. Thus, initially, a generic n-gram model built from large amounts of application-independent data is used. This causes a mismatch where n-gram models that model pre-ambles and post-ambles in real data are desired, because generic n-gram models only model complete sentences. Among other problems, this mismatch indicates that sentence beginning and sentence end probabilities in a generic n-gram are not reliable to predict a segment beginning (such as 702) and a segment end (such as 716) in a filler (such as 700). That is, $$p(<slot>|w) \neq p(<se>|w)$$
$$p(w|<slot>) \neq p(w|<ss>)$$

Equation 5 where <ss> and <se> are a sentence start and a sentence end, respectively. To address this problem, all links from start node 702 to internal words (links 704 and 710, for example) and all links from internal words to end node 716 (link 715, for example) are removed and backoff weights b(w1) and b(w2) are compensated accordingly. Backoff node 708 is relied upon to estimate segment beginning and end probabilities. For example, PCFG 700 in FIG. 7 becomes PCFG 800 in FIG. 8 after the above simplification. A PCFG generated in this manner can be used directly as a filler model in constructing grammars shown in FIG. 6, for example.

Figure 8:
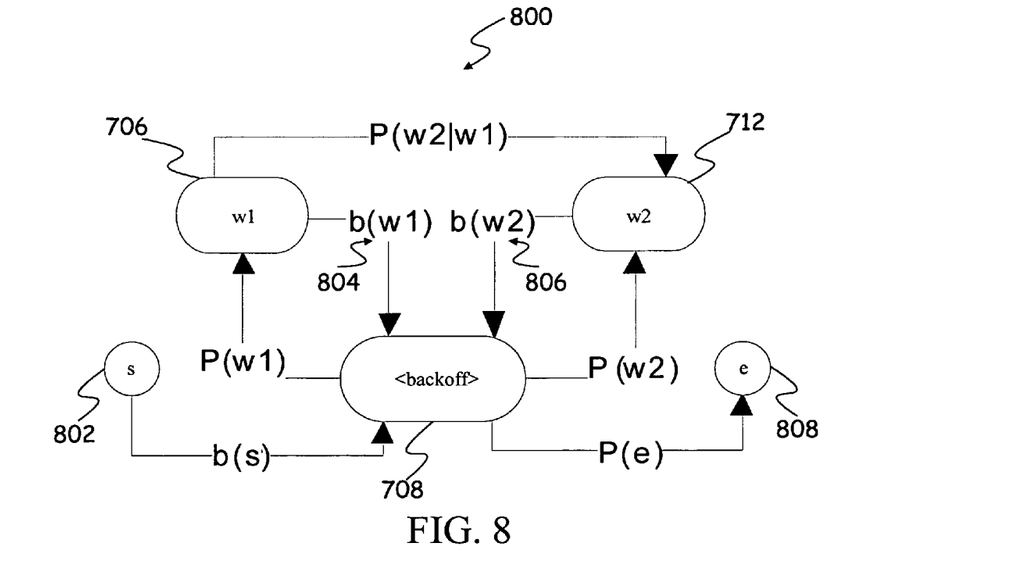
FIG. 8 is a schematic illustration of a shareable version of the PCFG shown in FIG. 7.

As can be seen in FIG. 8, start node 802 and end node 808 are disconnected from internal words 706 and 712 and therefore are not influenced by the internal words. Due to this independence of the start and end nodes, the PCFG 800, which constitutes a shareable FM, can relatively easily be introduced into different grammars and used to form different LMs (such as 216 (FIG. 2)). In FIG. 8, reference numerals 804 and 808 represent compensated backoff weights.

As noted above, PCFG 800 can be used directly as a pre-amble and a post-amble in constructing grammar 600 shown in FIG. 6. When PCFG 800 is used in FIG. 6, developers only need to provide a slot grammar (for example, a name list, cardinal or ordinary number, date, time, etc.). The slot grammar can be from a reusable library grammar or created with grammar controls.

Also, developers' domain knowledge can provide additional context information in the grammar. For example, in the ticket booking case, developers may anticipate that callers are likely to say "tickets" or "please" after the <integer> slot. Integrating these context words into the per-amble and/or post-amble can make the grammar perform more accurately.

In the present embodiments, developers can provide sample phrases such as " . . . <integer> tickets" and " . . . buy <integer> tickets." The developer-provided phrases, together with the default phrase " . . . <integer> . . . ," are used to improve the grammar. Eclipses in the phrases are treated as "[filler]" (where [ ] means that it is optional). These phrases are then converted into a training set. For example, the above phrases would give the following training set: <s> <integer> <e>|<s> <filler> <integer> <e>|<s> <integer> <filler> <e>|<s> <filler> <integer> tickets <e>|<s> <integer> tickets <e>|<s> buy <integer> tickets <e>|<s> <filler> buy <integer> tickets <e>.

Figure 91:
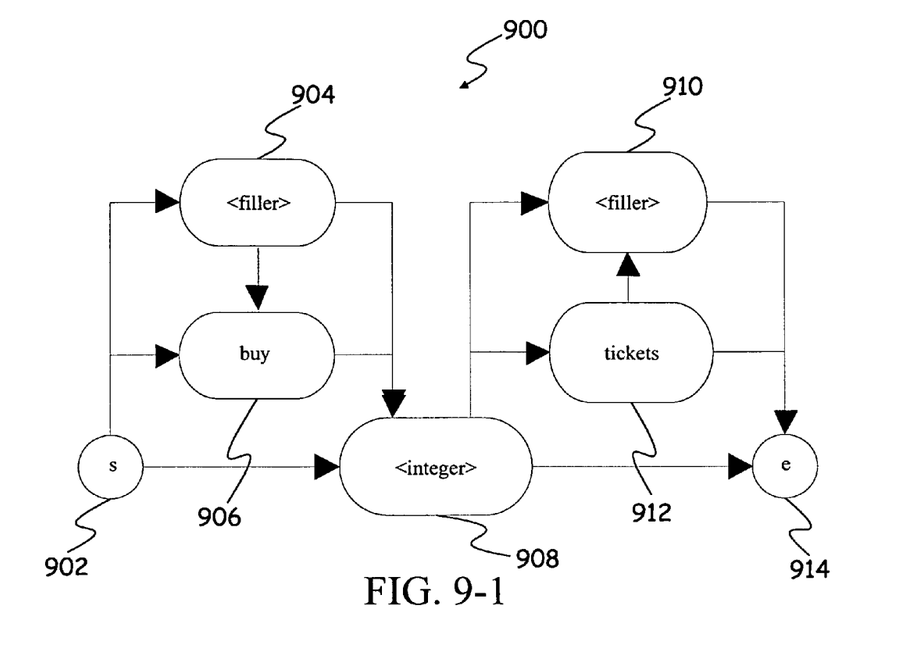

FIG. 9-1 shows an example grammar 900 generated using shareable FMs 904 and 910 and additional context cues 906 and 912. A standard n-gram training algorithm can be used to build the grammar shown in FIG. 9. In FIG. 9-1, start node (s) is represented by reference numeral 902 and end node (e) is represented by reference numeral 914. It should be noted that samples provided by developers are usually not sufficient to accurately estimate probabilities in FIG. 9-1. However, it has been found that speech recognition accuracy is not sensitive to such probability estimation errors, and that customized context significantly improves speech recognition accuracy.

The example shown in FIG. 9-1 in which context cues are integrated with the shareable FMs is of a relatively low complexity. LMs are typically formed by a more complex process, which involves employing a training set and a FM. For forming a LM, domain specific n-gram FMs, which were briefly discussed earlier, require large training sets and therefore are not practical. LM adaptation reduces a number of required training sentences but a generated model from LM adaptation is relatively large and therefore negatively impacts scalability on servers. In the present embodiments, a LM is formed by interpolating a shareable filler model with a training set. Here, a relatively "small" training set can be used without any substantial negative impact on the resulting LM.

Figure 92:
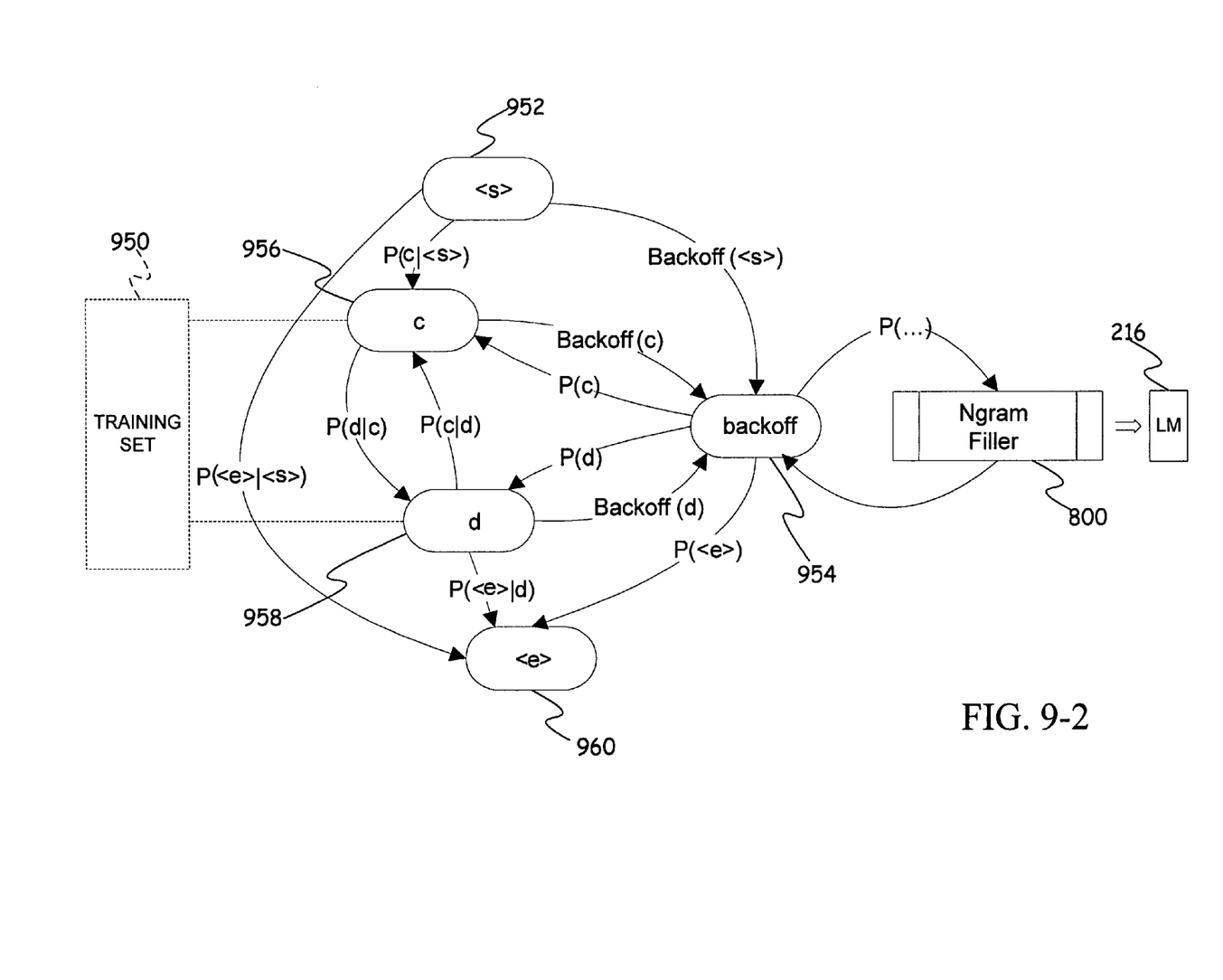

FIG. 9-2 illustrates the formation of a LM (such as 216) by interpolating a training set 950 with a shareable filler model (such as shareable n-gram filler 800). Here, to form the language model, words such as c and d (denoted by reference numerals 956 and 958) from training set 950 are interpolated, through backoff state 954, with shareable n-gram filler 800 to form language model 216. In FIG. 9-2, start node (s) is represented by reference numeral 952 and end node (e) is represented by reference numeral 960. As can be seen in FIG. 9-2, different probability and backoff computations are carried out as part of the interpolation process. As indicated above, these computations include interpolating the shareable filler model (such as shareable n-gram filler 800) with the training set 950, which includes, for example, interpolating through a backoff state 954 by removing at least one of bi-grams and tri-grams across domain-dependant and domain-independent n-grams. The computations are expressed in terms of the following equations.

$$\text{backoff}(c) = \max\left[\text{backoff}_{min}(x), \frac{\text{count}(c, \dots)}{\text{count}(c)}\right]$$ Equation 6

$$p(x|c) = (1 - \text{backoff}(c)) * \frac{\text{count}(c, x)}{\text{count}(c) - \text{count}(c, \dots)}$$ Equation 7

$$p(\dots) = \max\left[p_{min}(\dots), \frac{\text{count}(\dots)}{\sum_{x \in P \cup \{(e)\}} \text{count}(x)}\right]$$ Equation 8

$$p(x) = (1 - p(\dots)) * \frac{\text{count}(c)}{\sum_{x \in P \cup \{(e)\}} \text{count}(x)}$$ Equation 9

In Equations 6 through 9, x and c are words in a training set; p(x) is a probability of a next word being x; p( . . . ) is a probability of a next word being an insignificant or garbage word; count ( . . . ) is a number of insignificant words, count (c, . . . ) is a number of occurrences of a word bi-gram (c, . . . ), P is a set of all words (including any start node(s)) in a training set, <e> is an end node, backoff(c) and $\text{Backoff}_{min}$ (x) are backoff computations for c and x and p(x|c) is a probability of word x appearing after word c.

Figure 10:
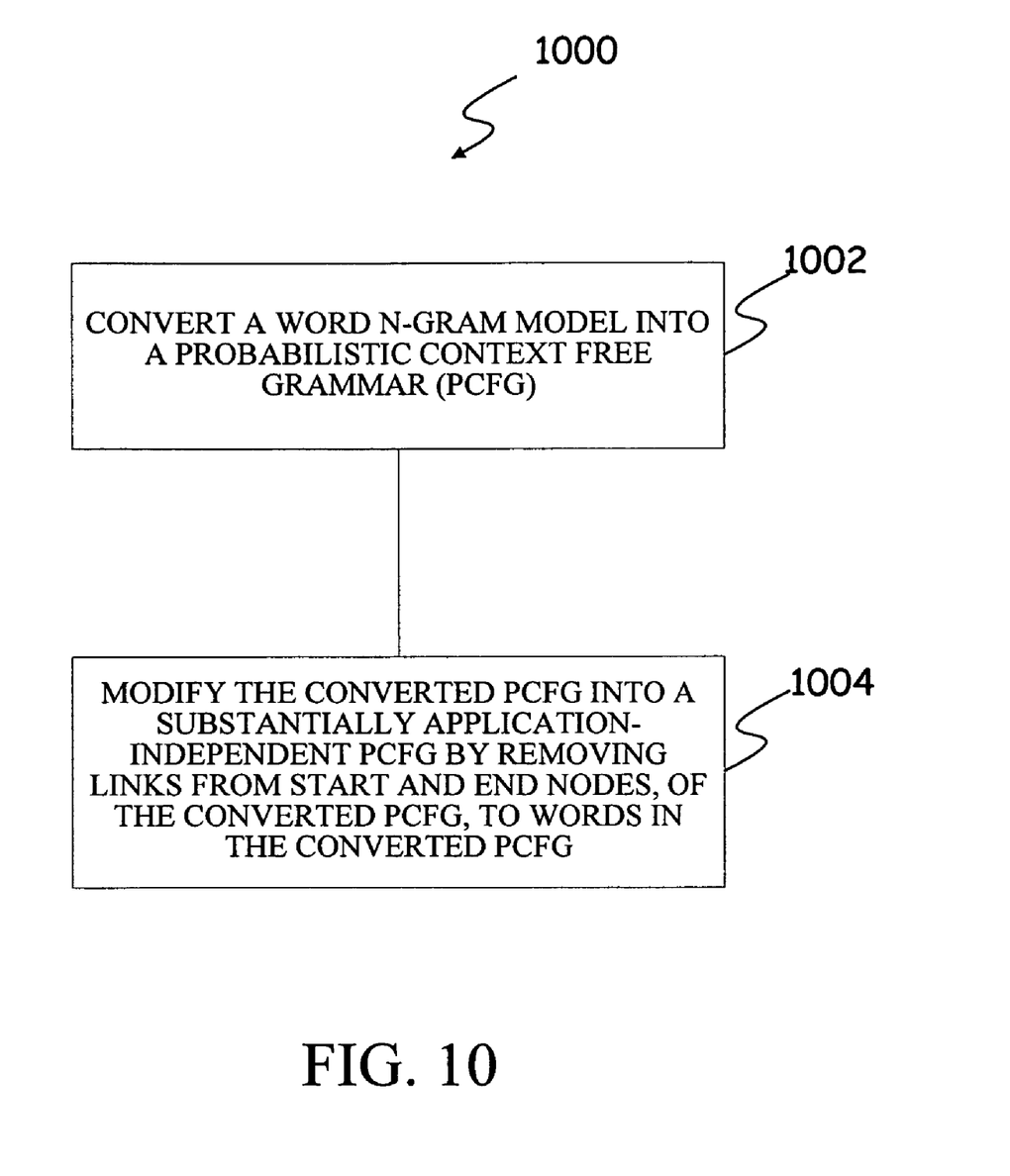
FIG. 10 is a flowchart that illustrates one of the present embodiments.

FIG. 10 is a flowchart 1000 that illustrates one of the present embodiments. Flowchart 1000 illustrates a method of forming a shareable filler model from a word n-gram model. At step 1002, the word n-gram model is converted into a PCFG. At step 1004, the PCFG is modified into a substantially application-independent PCFG by removing links from start and end nodes, of the PCFG, to words in the PCFG. In general, different techniques, some of which are set forth above, can be employed to carry out the steps shown in the flowchart of FIG. 10 while maintaining substantially the same functionality without department from the scope and spirit of the present embodiments.

Experimental Results

A series of experiments are conducted to evaluate an effectiveness of grammars authored using the approaches described above. Test cases from different datasets are separated into four sets:

SO (slot only): utterances only contain a slot part. There are 500 SO command utterances (SOC) and 500 SO time utterances (SOT) in this category.

PP (pre-amble and post-amble): utterances contain pre-ambles and/or post-ambles around slots. There are 25 PP command utterances (PPC) and 500 PP time utterances (PPT) in this category. Pre-ambles in this category are relatively simple words such as "at," "about," and "approximately."

OOG (out of grammar): utterances are completely off topic. There are 500 utterances in this category.

TS (two slots): utterances contain two slots plus pre-ambles and post-ambles. There are 669 utterances in this category.

A command slot includes 24 different commands, many of which are acoustically confusing, such as "start" and "restart," "call" and "all." A time slot allows a user to utter a time in any manner that the user may prefer.

Grammars used for evaluation purposes are also separated into several categories:

SO (slot only): grammar contains only a slot portion.

AFP (acoustic filler parallel) and AFS (acoustic filler series): grammar uses a context independent phone loop based acoustic FM. AFP is a parallel version that is similar to the configuration shown in FIG. 5; AFS is a series or sequential version that is similar to the configuration shown in FIG. 6.

NFP (n-gram filler parallel) and NFS (n-gram filler series): grammar uses an n-gram FM. NFP is a parallel version that is similar to the configuration shown in FIG. 5; NFS is a sequential version that is similar to the configuration shown in FIG. 6.

When evaluating speech recognition performance, slot accuracy (SA) or slot error rate (SER) is used for SO, PP, and TS test sets, and rejection rate (RR) for an OOG test set. SA and RR are defined as:

$$SA = \frac{\text{\# of correct slots}}{\text{total \# of slots}},\quad \text{Equation 10}$$

$$RR = \frac{\text{\# of rejected utterances with default threshold}}{\text{total \# of utterances}}.\quad \text{Equation 11}$$

In equations 6 and 7 # represents number.

Tabulated results obtained from experiments conducted in a manner described above are as follows:

TABLE 1

|     | SO    | AFP   | AFS   | NFP   | NFS   |
|-----|-------|-------|-------|-------|-------|
| SOT | 78.2% | 76.6% | 77.2% | 78.0% | 79.8% |
| SOC | 92.0% | 92.2% | 91.2% | 91.6% | 92.0% |

Table 1 above includes slot accuracy for utterances that only contain slots for time (SOT) and commands (SOC) evaluated with slot-only grammars (SO), acoustic fillers (AFS and AFP) and n-gram fillers (NFS, NFP).

TABLE 2

|     | SO    | AFP   | AFS   | NFP   | NFS   |
|-----|-------|-------|-------|-------|-------|
| PPT | 38.8% | 36.0% | 44.2% | 50.0% | 60.2% |
| PPC | 52.0% | 60.0% | 56.0% | 60.0% | 68.0% |

Table 2 above includes slot accuracy for utterances that only contain slots with pre-amble and/or post-ambles for time (PPT) and commands (PPC) evaluated with slot-only grammars (SO), acoustic fillers (AFS and AFP) and n-gram fillers (NFS, NFP).

TABLE 3

|      | SO    | AFP   | AFS   | NFP   | NFS   |
|------|-------|-------|-------|-------|-------|
| OOGT | 11.2% | 54.0% | 16.8% | 96.6% | 91.2% |
| OOGC | 0.4%  | 1.0%  | 0.6%  | 56.6% | 26.2% |

Table 3 above includes rejection rates for out-of-grammar (OOG) utterances in time and command scenarios evaluated with slot-only grammars (SO), acoustic fillers (AFS and AFP) and n-gram fillers (NFS, NFP).

A. Performance Evaluation

Figure 11:
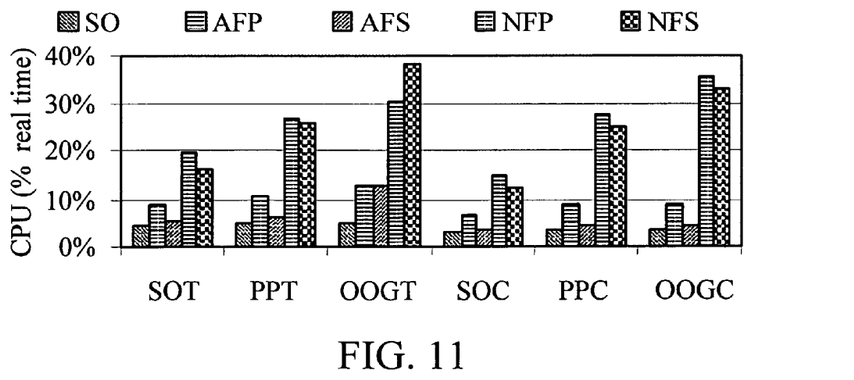
FIG. 11 is a graph illustrating a comparison of different grammars in central processing unit (CPU) time.

Tables 1, 2, 3 and FIG. 11 compare performances of different grammars using different test sets. In Table 1, it is seen that NFP and NFS grammars perform as well as SO grammars for SO test sets, and even perform slightly better due to their ability to absorb noise before and after the utterances. In Table 2, it is seen that for test sets with pre-ambles or post-ambles, the NFS grammar consistently performs significantly better than other grammars, with SA improvement of 58% for the PP-time set, and 31% for the PP-command set compared to the SO grammar. In Table 3, it is seen that NFS grammars reject many more OOG utterances than SO and AF grammars. Note that, an NFP grammar has a higher rejection rate on the OOG utterances than the NFS grammar. However, since a number of OOG utterances in a typical application is much less than a number of PP utterances, NFS grammar performs better overall.

FIG. 11 indicates that a better performance of NF grammars comes at a cost: CPU time is about 3-5 times what is needed for SO or AF grammars. Also evaluated are, a sensitivity of the accuracy and CPU costs related to bypass probability p1 (from 0.5 to 0.999) used in FIG. 6, and bi-gram size (from 0K to 280K). Experimental results show that accuracy is not sensitive to either bypass probability or n-gram size, although increasing bi-gram size usually provides a relatively small boost to accuracy. However, more CPU time is needed when bypass probability becomes smaller or n-gram size becomes larger. A rejection rate also increases when n-gram size becomes larger for OOG test sets.

B. N-gram Filler Adaptation

Table 4, which is included and described further below, compares performances of different grammars, described above, with and without adaptation. Test cases used in this experiment are from test sets where callers' utterances contain two slots, such as "I'd like to book a ticket from Seattle to Boston." An utterance is considered correctly recognized if both slots (cities) are correctly recognized. Two training phrases (with context words) "... flight from <fromCity> to <toCity>" and "... between <fromCity> and <toCity>" are used to generate an adapted NFS grammar, and a domain n-gram filler is trained using a large amount of training data. Table 4 shows that the NFS grammar has significantly higher slot accuracy than the AF grammar and adding context words in the grammar can further improve the accuracy by 5.23% absolute or reduce the slot error rate by 56%. This accuracy is close to what can be obtained by using a grammar trained with domain data.

TABLE 4

| Filler type | AF   | NFS   | Adapted NFS | Domain n-gram |
|-------------|------|-------|-------------|---------------|
| SA          | 2.4% | 90.7% | 96.0%       | 96.0%         |

Table 4 includes slot accuracy for an acoustic filler and n-gram fillers without and with adaptation. As can be seen in Table 4, adapting an n-gram filler causes a reduction in error rates (or increases slot accuracy).

C. Advantages of the Shareable FM

The above experimental results show that, when compared to other FMs, the above-described shareable FM has several advantages. First, the shareable FM can be directly integrated into a PCFG and thus can be applied to any PCFG based ASR engine (many commercial engines support W3C's speech recognition grammar specification (SRGS) for specifying CFGs). Second, transitions between FMs and semantic slots in the present embodiments are automatically determined by an ASR's search algorithm (that is, there is no need to use segmental likelihood ratio based hypothesis test in the decoding process). Third, the shareable FM has a grammar structure that, in general, is more robust and accurate than other FMs. Fourth, the shareable FM provides a higher rejection rate for out-of-grammar (OOG) utterances than other FMs. Fifth, the FM can be shared across different applications and dialog turns and therefore saves memory. Sixth, the shareable FM can benefit from example sentences provided by developers to further improve accuracy.

Additionally, since an ASR engine outputs actual words (instead of just a generic symbol such as <garbage> provided by an acoustic FM), systems that rely on natural language input, such as a call-routing system, can rely on text provided by the shareable FM to make decisions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implementable method comprising:
providing a generic word n-gram model;
converting, using a processor of a computer, the word n-gram model into a probabilistic context free grammar (PCFG);
modifying, using the processor of the computer, the PCFG into a substantially application-independent PCFG, which constitutes a generic shareable filler model, and
recognizing speech signals with the help of the shareable filler model using the processor of the computer,
wherein modifying the PCFG into a substantially application-independent PCFG comprises removing links from a start node of the PCFG to words in the PCFG to eliminate all links between the start node of the PCFG to words in the PCFG and only maintaining at least one link between the start node and at least one backoff node, the backoff node being utilized to estimate probabilities associated with the start node and the end node.

2. The method of claim 1 wherein modifying the PCFG into a substantially application-independent PCFG further comprises removing links from the words in the PCFG to an end node of the PCFG and only maintaining at least one link between the end node and the at least one backoff node.

3. The method of claim 2 wherein modifying the PCFG into a substantially application-independent PCFG further comprises updating backoff weights in the PCFG to compensate for the removed links from the start node to the words and from the words to the end node.

4. A language model comprising the shareable filler model formed in the method of claim 1.

5. A speech recognition system comprising the language model of claim 4.

6. A grammar comprising a pre-amble, a post-amble and a slot between the pre-amble and the post-amble, wherein each of the pre-amble and the post-amble comprises the shareable filler model formed in the method of claim 1.

7. A grammar authoring architecture comprising:
a memory storing at least one slot that carries semantic information and at least one filler in series with the at least one slot,
a processor executing a model in which the at least one filler is modeled with a PCFG that is generated from a generic word n-gram, the processor outputting a speech recognition result, and
wherein the PCFG is substantially application-independent and comprises internal words that are disconnected from its start node and its end node by elimination of all links between the start node of the PCFG and the internal words and elimination of all links between the end node of the PCFG and the internal words, and
wherein only at least one link between the start node and at least one backoff node and only at least one link between the end node and the least one backoff node are maintained, and
wherein the backoff node is utilized to estimate probabilities associated with the start node and the end node.

8. The architecture of claim 7 and further comprising context cues integrated with the at least one filler.

9. The architecture of claim 7 wherein the substantially application-independent PCFG further comprises backoff weights that are adjusted to compensate for the disconnected internal words.

10. The architecture of claim 9 and further comprising context cues integrated with the at least one filler.

11. A computer-implementable method comprising:
providing a shareable filler model;
interpolating, using a processor of a computer, the shareable filler model with a training set; and
recognizing speech signals with the help of the shareable filler model interpolated with the training set using the processor of the computer,
wherein the shareable filler model is a word n-gram based shareable filler model, and
wherein the word n-gram based shareable filler model comprises a substantially application-independent PCFG that is generated from a word n-gram, and
wherein the substantially application-independent PCFG comprises internal words that are disconnected from its start node and its end node by elimination of all links between the start node of the PCFG and the internal words and elimination of all links between the end node of the PCFG and the internal words, and
wherein only at least one link between the start node and at least one backoff node and only at least one link between the end node and the least one backoff node are maintained, and
wherein the backoff node is utilized to estimate probabilities associated with the start node and the end node.

12. A speech recognition system comprising a language model formed in the method of claim 11.

* * * * *